US006921268B2

(12) United States Patent
Bruno et al.

(10) Patent No.: US 6,921,268 B2
(45) Date of Patent: Jul. 26, 2005

(54) METHOD AND SYSTEM FOR KNOWLEDGE ASSESSMENT AND LEARNING INCORPORATING FEEDBACKS

(75) Inventors: James E. Bruno, Los Angeles, CA (US); Charles J. Smith, Encinitas, CA (US); Arthur Blank, Encinitas, CA (US); Len Schiedel, Encinitas, CA (US); Bob Serling, Cardiff by the Sea, CA (US)

(73) Assignee: Knowledge Factor, Inc., Denver, CO (US)

( * ) Notice: Subject to any disclaimer, the term of this patent is extended or adjusted under 35 U.S.C. 154(b) by 182 days.

(21) Appl. No.: 10/115,157

(22) Filed: Apr. 3, 2002

(65) Prior Publication Data
US 2003/0190592 A1 Oct. 9, 2003

(51) Int. Cl.[7] .............................................. G09B 11/00
(52) U.S. Cl. .................... 434/323; 434/307 R; 434/236
(58) Field of Search .............................. 434/322, 323, 434/350, 362, 365, 236–238, 118

(56) References Cited

U.S. PATENT DOCUMENTS

| | | | | |
|---|---|---|---|---|
| 5,437,553 A | * | 8/1995 | Collins et al. | 434/322 |
| 5,577,919 A | * | 11/1996 | Collins et al. | 434/322 |
| 5,618,182 A | * | 4/1997 | Thomas | 434/323 |
| 5,904,485 A | * | 5/1999 | Siefert | 434/322 |
| 6,039,575 A | * | 3/2000 | L'Allier et al. | 434/323 |
| 6,422,869 B1 | * | 7/2002 | Nagarajan et al. | 434/156 |
| 6,514,084 B1 | * | 2/2003 | Thomas | 434/322 |
| 6,648,651 B1 | * | 11/2003 | Cadman et al. | 434/322 |
| 6,652,283 B1 | * | 11/2003 | Van Schaack et al. | 434/236 |

FOREIGN PATENT DOCUMENTS

WO    WO 00/19393    * 4/2000    ............ G09B/7/06

* cited by examiner

*Primary Examiner*—Xuan M. Thai
*Assistant Examiner*—Kathleen M. Christman
(74) *Attorney, Agent, or Firm*—Law Offices of Royal W. Craig (57) ABSTRACT

A method and system for knowledge assessment and learning that assesses the true knowledge of a human subject. The invention incorporates non-one dimensional testing techniques to obtain the subject's knowledge and associated confidence level. The invention produces an assessment or test profile, including formative and summative evaluation, which is correlated to a database of learning materials and presented to the subject for review and/or reeducation of the substantive response. The invention accommodates various test queries without regard to the specific nature of the queried subject. The present invention is adaptable for use in microprocessor-based stand alone computers, individual use or distributed in a client-server environment of a communication network. The system incorporates a plurality of user-interfaces and web browser dialog controls inputting the queries, administering the assessment, providing feedback to the system user and/or the test subject and providing learning materials according to the assessment profile.

41 Claims, 5 Drawing Sheets

METHOD AND SYSTEM FOR KNOWLEDGE ASSESSMENT AND LEARNING INCORPORATING FEEDBACKS

Applicants claim priority from earlier filed International Patent Application No. PCT/US01/31633, filed with the United States Patent Office as the receiving office on Oct. 4, 2001, which claimed the benefit of the filing date of U.S. Provisional Patent Application filed under Ser. No. 60/237,789 on Oct. 4, 2000.

FIELD OF THE INVENTION

The present invention relates to knowledge assessment and learning and more particularly, to microprocessor and networked based testing and learning systems.

BACKGROUND

Traditional multiple choice testing techniques to assess the extent of a person's knowledge in a subject matter include varying numbers of possible choices that are selectable by one-dimensional, or right/wrong (RW) answers. A typical multiple choice test might include questions with three possible answers, where generally one of such answers can be eliminated by the test subject as incorrect as a matter of first impression. This gives rise to a significant probability that a guess on the remaining answers could result in a correct response. Under this situation, a successful guess would mask the true extent or the state of knowledge of the test subject, as to whether he or she is informed (i.e., confident with a correct response), misinformed (i.e., confident in the response, which response, however, is not correct) or lacking information (i.e., having no information). Accordingly, the traditional multiple choice one-dimensional testing technique is highly ineffectual as a means to measure the true extent of knowledge of the test subject. Despite this significant drawback, the traditional one-dimensional, multiple choice testing techniques are widely used by information-intensive and information-dependent organizations such as banking, insurance, utility companies, educational institutions and governmental agencies.

In response to the foregoing drawback, an information referenced testing technique was developed and pioneered by Dr. James Bruno of the University of California at Los Angeles. Information referenced testing ("IRT") techniques extract the test subject's information response and confidence associated with it, undertake to reduce guessing, and effect a scoring profile that is resistant to the affects of guessing. IRT test queries are generally represented in a two-dimensional format to incorporate two key components of recognition and confidence as part of the test questions or queries in a multiple choice test. The test example below illustrates the general principle of the IRT technique.

1. How many legs does a cat have?
   A. 3
   B. 4
   C. 5
2. What is the common logarithm of the number 3?
   A. 43
   B. 47
   C. 0.047
3. How many states border the state of New Mexico?
   A. 4
   B. 5
   C. 6
4. The Panama Canal connecting the Atlantic and Pacific Oceans generally runs
   A. North-South
   B. East-West
   C. Northeast-Southwest Instructions:

Each question has a predetermined point score of +30 if the answer is correct or −100 if the answer is incorrect.

If you can narrow your selection to two choices and eliminate the other choice as being an answer, mark your answer for the two choices: (A or B), (B or C), (A or C). Your response will be assigned a predetermined point score of +10 if the answer is correct or −100 if the answer is incorrect.

If you do not know the answer, you may choose not to respond, in which case, you will not receive any points.

When certain that an answer is correct, the test subject selects a response from one of the letters A, B, or C, which corresponds to the answer that the subject is confident to be correct. Thus the selection of a single letter indicates a high confidence level in the answer on the part of the test subject. If the response reflects the correct answer, a point score of 30 will be assigned. Thus this point score of 30 represents a score assigned for an informed response. However, if the test subject selects one of the letters A, B, or C, which reflects a confidence in that response, a wrong answer for the response will return a point score of −100. This negative point score marks a state of misinformation, and the subject is misinformed as to the substantive information pertaining to that query.

If the subject chooses not to select any of the letters provided, which indicates that he or she has no knowledge or information to provide a response, a zero point score will be returned.

Thus, with respect to the above sample queries, if the test subject answered the above questions 1-B, 2-? 3-BC, and 4-B the test subject would be considered as being informed, uninformed, part informed, and misinformed respectively on these test queries.

As illustrated above, the point scoring system of the IRT for correct and incorrect responses for the confidence levels reflected in the subject's answers are (a) +30, −100 when confident or sure; (b) +10, −100 when between two choices; and (c) 0,0 when the subject is without any information. Under the IRT protocol, a maximum score would be achieved if and only if the test subject is "honest" and does not overvalue his or her information. Thus any incentives to guess at an answer are significantly discounted.

Currently, use of the IRT techniques are on a case-by-case, or batch processing, with test creation, administration, scoring and reporting, which use requires significant human interface, labor and logistic support. More significantly is that informational or education material databases are generally disassociated with the results of the test performance and results interpretation thus impeding remedial actions to reeducate or retrain. The affects of such case-by-case application are further amplified where the tests are to be conducted at various locations.

Accordingly, there is a need for a robust and easily managed integral knowledge assessment and learning system, which is deployable in a distributed computer environment for developing and administering knowledge assessment across chronological and geographical bounds. Such a networked testing system would eliminate batch IRT processing, provide for a wider distribution of test subjects in organizations, ensure full confidentiality of the employee, and allow a more detailed and intelligent learning system which is geared toward the true information need of the user.

SUMMARY OF THE INVENTION

The present invention provides a method and system for knowledge assessment and learning, accurately assesses the true extent of a test subject's knowledge and provides learning or educational materials remedially to the subject according to identified areas of deficiency. The invention incorporates the use of information reference testing ("IRT") techniques and is deployable on a microprocessor based computing device or networked communication client-server system.

The assessment employs a non-one-dimensional technique to extract the knowledge and confidence level of the test subject, who is administered at least one query in the format of a non-one-dimensional query. The query is categorically answerable by confidence level and by substantive multiple-choice answers. The confidence categories are predefined as confidence levels between the range of 0% percent to 100% terms of selected levels with typical categories being "100% confident, or sure" "50% confident, or partially sure" and "unknown".

Responding to the responses of the test subject, the system compiles and scores the test subject's responses, and develops a knowledge profile. The knowledge profile includes a weighted score based on a weighted scoring protocol or scheme, which can be expressed as an actual percentage score for the entire set of queries The knowledge profile may also include a self-confidence percentage score for all queries considered by the subject as "sure" or "partially sure". The system also computes and presents a degree of misinformation or information gap.

The weighted scores and the knowledge profile are presentable to the test subject or other system users. The presentation includes a display of the percentage of the responses of the test subject, scored and grouped according to distinct information quality regions. These regions include "misinformed, (answered 100% confident and incorrect or 50% confident and incorrect)"; "uninformed (answered unknown); partially informed (answered 50% confident and correct)"; and "fully informed (answered 100% confident and correct)".

The system further correlates the knowledge profile to a database of learning materials, which are organized and prioritized based on the identified informational needs of the test subject. The learning materials can be presented to a system user or the test subject for review and/or reeducation thereby ensuring the subject's acquisition of the true knowledge and accurate information in a cost-effective manner. These materials include detailed correct substantive answers with explanation. Additionally, the system provides direct-linked access to other sources of learning materials or information depositories via the Internet.

The present invention is adapted for deployment in a microprocessor-based stand-alone computing device, for individual and network-distributed in a client-server environment of a communication network. The system incorporates various user-interfaces, software scripts, web browser dialog controls and other software and hardware support means for query construction, user inputs, data collection, reduction and storage, system management, reporting, and learning or training support. The invention further provides input facilities and editorial supports for test construction and accommodates various test queries without regard to the specific nature of the information or knowledge on which the assessment is administered.

Other objects, features, and advantages of the present invention will become more apparent from the following detailed description of the preferred embodiment and certain modifications thereof when taken together with the accompanying drawings.

DETAILED DESCRIPTION

The present invention provides a method and system for conducting knowledge assessment and learning. The invention incorporates the use of information reference testing techniques deployable on a micro-processor-based or networked communication client-server system, which extracts knowledge-based and confidence-based information from a test subject. The assessment incorporates non-one-dimensional techniques.

The invention produces a knowledge profile, which includes formative and summative evaluation for the system user and identifies various knowledge quality levels. Based on such information, the system correlates the knowledge profile to a database of learning materials, which is communicated to the system user or test subject for review and/or reeducation of the substantive response.

The invention interactively accommodates various aspects of test administration and learning by a system user including storage of information and learning materials, test or query creation, editing, scoring, reporting and learning support without regard to the specific nature of the information on which the test subject is tested.

The present invention is adaptable for deployment on a stand alone personal computer system. In addition, it is also deployable in a computer network environment such as the World Wide Web, or an intranet client-server system, in which, the "client" is generally represented by a computing device adapted to access the shared network resources provided by another computing device, the server.

Figure 1:
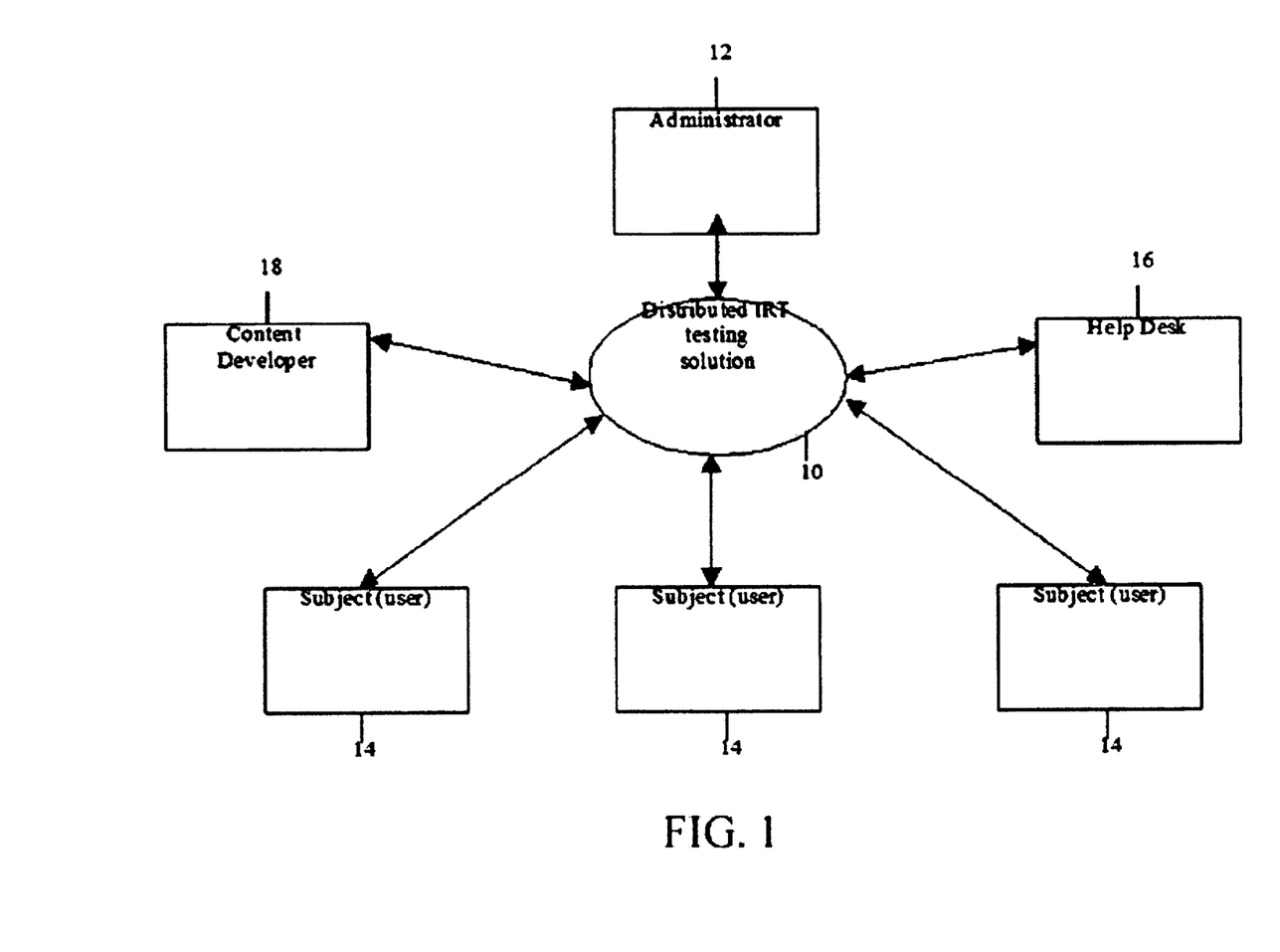
FIG. 1 is a conceptual design diagram showing the various participants to and interaction of the knowledge and misinformation testing system according to the present invention.

As shown in FIG. 1, the knowledge assessment method and learning system 8 of the present invention provides distributed information reference testing solution 10 to serve the interactive needs of its users. Any number of users may perform one function or fill one role only while a single user may perform several functions or fill many roles. For example, a system administrator 12 may perform test assessment management, confirm the authenticity of the users 14, deliver the test queries to multiple users 14 who may includes test subjects, (by password, fingerprint data or the like), and monitor the test session for regularity, assessment and feedback. Likewise, the system users 14 provide authentication to the administrator 12 and take the test. A help desk 16, which might be stationed by appropriate personnel, is available to the users 14 for any problems that might arise. A content developer 18, or test author, designs and produces the test content.

Figure 2:
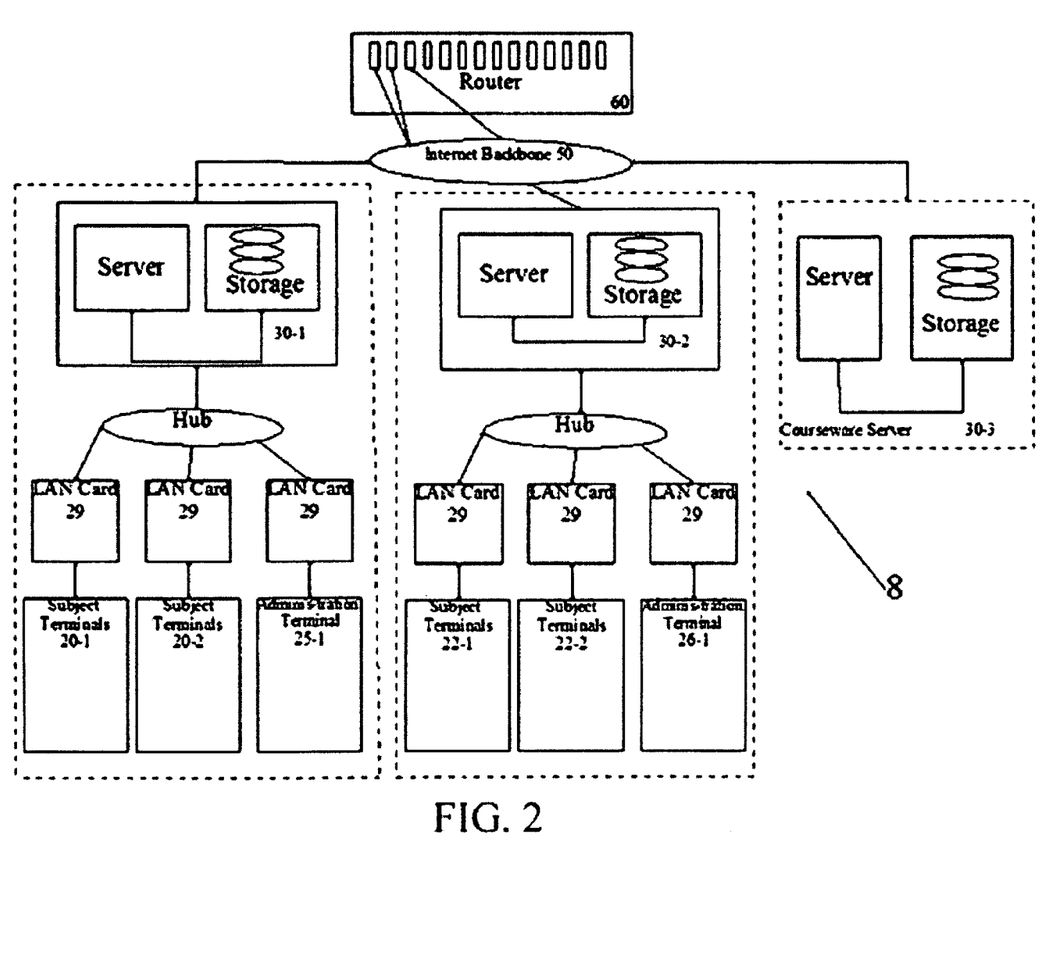
FIG. 2 is a perspective drawing of an exemplary computer network architecture that supports the method and system of the present invention.

Although the present invention is adaptable for a variety of assessment, evaluation, and testing applications, it will herein be described in the context of a distributed learning environment. As shown in FIG. 2, the present invention comprises a computer network architecture to effect the distribution of the knowledge assessment and learning functions, and generally encompasses the various functional steps, as represented by logical block 100 in FIG. 3. Knowledge assessment queries or questions are administered to the test subjects of each registered organization through a plurality of subject terminals 20-1, 2 . . . n, and 22-1, 2 . . . n. One or more administrator terminals 25-1, 26-1 are provided for administering the tests from the respective organizations. Each subject terminal 20, 22 and Administrator Terminal 25, 26 is shown as a computer workstation that is remotely located for convenient access by the test subjects and the administrator(s), respectively. Communication is effected by computer video screen displays, input devices such as keyboard, touch pads, "game pads," mouse, and other devices as known in the art. Each subject terminal 20, 22 and administrator Terminal 25, 26 preferably employs sufficient processing power to deliver a mix of audio, video, graphics, virtual reality, documents, and data.

Groups of test subject terminals 20, 22 and administrator terminals 25, 26 are connected to one or more network servers 30 via network hubs 40. Servers 30 are equipped with storage facilities such as RAID memory to serve as a repository for subject records and test results.

As seen in FIG. 2, local servers 30-1, 30-2 are connected in communication to each other and to a courseware server 30-3. As illustration of the system's remote operability, the server connections are made through an Internet backbone 50 by conventional Router 60. Information transferred via Internet backbone 50 is implemented via industry standards including the Transmission Control Protocol/Internet Protocol ("TCP/IP").

Figure 3:
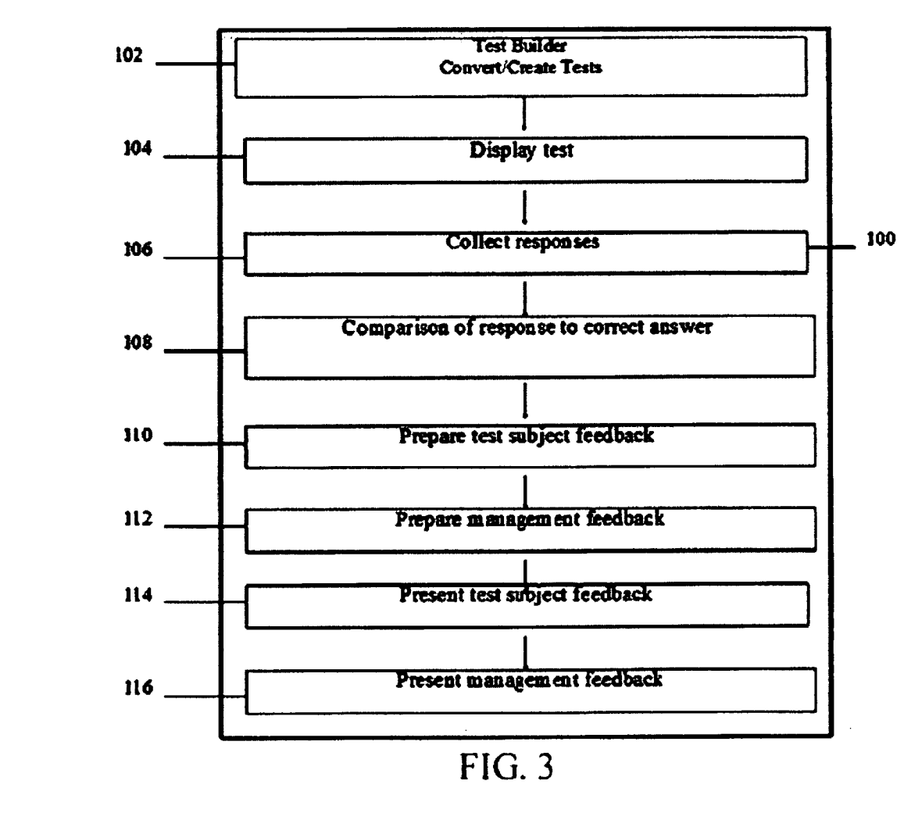
FIG. 3 is a logical block diagram of an embodiment of a testing and reporting structure according to the present invention.

Courseware, or software dedicated to education and training and administrative support software are stored and maintained on courseware server 30-3 and preferably conforms to an industry standard for distributed learning model (the ADL initiative), such as the Sharable Courseware Object Reference Models (CO-RM) for courseware objects that can be shared across systems. Courseware server 30-3 supports and implements the software solution of the present invention, including the functional steps as illustrated in FIG. 3. The software can be run on subject terminals 20, 22, which is subject to the independent controlled by an administrator. The system 8 provides electronic storage facilities for various databases to accommodate the storage and retrieval of educational and learning materials, test contents and performance and administration-related information.

In operation, any remotely located test subject can communicate via a subject terminal 20, 22 with any administrator on an administrator terminal. The system 8 and its software provides a number of Web-based pages and forms, as part of the communication interface between a user (including system administrator 12, test subject 14 and test content developer 18) and the system to enable quick and easy navigation through the knowledge assessment process. A Web-based, browser-supported home page of the knowledge assessment and learning system of the present invention is presented to the system user, which serves as a gateway for a user to access the system's Web site and its related contents. The homepage includes a member (user) sign-in menu bar, incorporating necessary computer script for system access and user authentication. For illustrative purposes, the term "member," is sometimes synonymously referred herein as "user."

A member sign-in prompts system 8 to effect authentication of the user's identify and authorized access level, as generally done in the art.

The present invention provides a computer software-based means or test builder or composer builder module 102 by which a user, such as a test administrator or a test content developer can construct a test.

For purposes of illustration, the test construction or building will herein be described with reference to a sample test that is accessible via the homepage with a "Build" or "Compose" option. The selection of this "Build" option leads to a Test Builder (composer) screen. The Test Builder main screen incorporates navigational buttons or other means to access the major aspects of test formulation. The test builder screen includes several functional software scripts in support of administrative tasks, such as accounting and user authentication, test creation, edit and upload, review of users' feedback statistics and provides a user's interface with system 8 for creating a new test. For purposes of discussion herein the test builder screen is also called "Create New Test Screen."

Upon authentication of the user, system 8 leads the user to the test builder screen. The test builder screen prompts the user to fill in text boxes for information such as test identification, test name, and author identity, and initializes the test building module. Upon test initialization, the system provides the user with options for the input of test contents, by way of test creation, edition of existing test, upon test and or images.

System 8 further provides editorial and formatting support facilities in Hypertext Mark-Up Language ("HTML") and other browser/software language to include font, size and color display for text and image displays. In addition, system 8 provides hyperlink support to associate images with questions and queries with educational materials.

As mentioned above, system 8 is adapted to allow the user to upload an ASCII-text file for use in importing an entire test or portion thereof using a number of Web-based pages and forms, as part of the communication interface between the user and the system. In addition, test builder module 102 is also adapted to receive an image file in various commonly used formats such as *.GIF and *.JPEG. This feature is advantageous as in the case where a test query requires an audio, visual and/or multi-media cue. Text and image uploading to the system is accomplished by the user activating a script or other means incorporated as part of the user interface or screen image. As part of the test builder ("Create New Test") screen, a hyperlink is provided on the screen image, which activates a system script to effect the file transfer function via conventional file transfer protocols.

Test builder module 102 allows test authors to convert their existing tests or create new tests in the appropriate format. A test author inputs a question or query and a plurality of potential answers. Each question must have a designated answer as the correct choice and the other two answers are presumed to be wrong or misinformed responses. In the example as shown, each of the queries has three possible choices.

Once the body of a test has been constructed using the input facilities incorporated as part of the web pages presented to the user, test builder 102 configures the one-dimensional right-wrong answers to non-one dimensional answer format. Thus, in one embodiment of the present invention in which a query has three possible answers, a non-one-dimensional test, in the form of a two-dimensional answer is configured according to predefined confidence categories or levels. Three levels of confidence categories are provided, which are designated as: 100% sure (selects only one answer); 50% certain (select a pair of choices that best represents the answer (A or B) (B or C), or (A or C); and Unknown. For the 50% certain category, the answers are divided up into possible combination of pairs of choices (A or B) (B or C), or (A or C). The entire test is arranged with each query assigned by system 8 to a specified numbered question field and each answer assigned to a specified lettered answer field. The queries, confidence categories and the associated choices of possible answers are then organized and formatted in a manner that is adaptable for display on the user's terminal. Each possible choice of an answer is further associated with input means such as a point-and-click button to accept an input from the test subject as an indication of a response to his or her selection of an answer. In one embodiment of the present invention, the presentation of the test queries, confidence categories and answers are supported by commonly used Internet-based browsers. The input means can be shown as separate point-and-click buttons adjacent each possible choice of answer. Alternatively, the input means can be embedded as part of the answer choice display, which is activated when the test subject points and clicks on the answer.

As seen from the above discussion, the present system substantially facilitates the construction of non-one-dimensional queries or the conversion of traditional one-dimensional or "RW" queries. The test building function of the present invention is "blind" to the nature of the test materials on which the test is constructed. For each query or question, the system would only need to act upon the form of the test query but not its contents; possible answers and correct answer; and the answer choice selected by the test subject.

Test builder 102 also allows a user to link each query to specific learning materials or information pertaining to that query. The materials are stored by the system, providing ready access to the user as references for text construction. They also form a database to which the test subject is directed for further training or reeducation based on the performance of the knowledge assessment administered to the test subject. These learning materials include text, animations, audio, video, web pages, and IPIX camera and similar sources of training materials. An import function as part of the test builder function is provided to accept these linked materials into the system.

Presentation of the knowledge assessment queries or tests to the test subject is initiated by a "Display Test" or display test module 104. Supported by a computer script, display test module 104 includes administrative functions for authentication of each test subject, notification of assessment session and for the retrieval of the queries from the system for visual presentation to the test subject. Optionally, the queries may be presented in hypertext or other software language formats linkable by appropriate Uniform Resource Locators ("URL's"), as the administrator may determine, to a database of learning materials or courseware stored in system 8 or to other resources or Web sites.

As mentioned above, knowledge assessment of a test subject is initiated by the presentation of the number of non-one-dimensional queries to the test subject. Each of these queries is answerable as a response to a substantive multi-choice answer selectable from a predefined confidence category.

As an example of the embodiment of the present invention, the test queries or questions would consist of three answer choices and a two-dimensional answering pattern that includes the test subject's response and his or her confidence category in that choice. The confidence categories are: "I am sure," "I am partially sure," and "I don't know." A query without any response is deemed as, and defaults to, the "I don't know" choice.

The knowledge assessment of the present invention can be administered to separate test subjects at different geographical locations and at different time periods. In addition, the knowledge assessment can be administered in real time, with test queries presented to the test subject. The entire set of test queries can be downloaded in bulk to a test subject's workstation, where the queries are answered in their entirety before the responses are communicated (uploaded) to the courseware server of system 8. Alternatively, the test queries can be presented one at a time with each query answered, whereupon the test subject's response is communicated to the courseware server. Both methods for administering the knowledge assessment can optionally be accompanied by a software script or subroutine residing in the workstation or at the courseware server to effect a measurement of the amount of time for the subject to respond to any or all of the test queries presented. When so adapted, the time measuring script or subroutine functions as a time marker. In an exemplary embodiment of the present invention, the electronics time marker identifies the time for the transmission of the test query by the courseware server to the test subject and the time when a response to the answer is returned to the server by the test subject. Comparison of these two time markings yield the amount of time for the subject to review and respond to the test query.

When all queries have been answered, a "score your test" function is invoked, as by way of the test subject clicking a "Score Your Test" button bar on the subject's workstation terminal or input device, which terminates the knowledge assessment session. System 8 initializes the operation of "Collect Responses" or collect responses module 106, which comprises computer software routine, to collect the test subject's responses to the test queries. These responses are then organized and securely stored in a database of collected responses associated with system 8.

Thereafter, a scoring engine or comparison of responses module 108 ("Comparison of Responses") is invoked to perform a "Comparison of responses to correct answer" on the subject's responses with the designated correct answers on which the test results are calculated.

As discussed above, the present invention adopts a scoring protocol, by which the test subject's responses or answers are compiled using a predefined weighted scoring scheme. This weighted scoring protocol assigns predefined point scores to the test subject for correct responses that are associated with an indication of a high confidence level by the test subject (that is, informed response or answers). Such point scores are referred herein as true knowledge points, which would reflect the extent of the test subject's true knowledge in the subject matter of the test query.

Conversely, the scoring protocol assigns negative point scores or penalties to the test subject for incorrect responses that are associated with an indication of a high confidence level (that is, misinformed responses or answers). The negative point score or penalty has a predetermined value that is significantly greater than the true knowledge points for the same test query. Such penalties are referred herein as misinformation points, which would indicate that the test subject is misinformed of the matter.

The present inventive method and system for knowledge assessment neither rewards nor penalizes the test subject recognizing not knowing the answer for any test query. Accordingly, the scoring protocol does not assign nor deduct any point score for that particular query.

The scoring protocol assigns partial credit where the test subject is reasonably sure (for example, 50% certain) of the answer, as indicated by the test subject selecting more than one answer or by eliminating one or more answer where the subject considers as wrong. However, the test subject is also significant penalized in point score, relative to the point scores for a wrong answer where the test subject has indicated a reasonable confidence in the subject matter pertaining to the response (that is partially informed responses or answers).

As an example, in an assessment where there are three predefined confidence categories or levels, "100% confidence", "50% confidence", and "Don't know," the scoring levels are represented by four levels or regions of information or knowledge quality: (1) Fully informed, +30; (2) Partially informed, +10; (3) Uninformed, 0; and (4) Misinformed, −100. As indicated, these scoring levels are accompanied by award or penalty points, which are also predefined by the test administrator as part of the assessment protocol to encourage a response that accurately reflect the test subject's perceived confidence level associated with his or her response.

As exemplified above, for any given test query, the designated point score for a fully informed response is greater than the point score for a partially informed response. Where the test subject provides a "Don't know" response, no point score is awarded. To discourage guessing, as may be the case where the test subject has provided an incorrect response while indicating "100% confidence," a negative point score is assigned with a value that is significantly greater than the point score awarded to either a fully informed or partially informed score. Thus though the reward and penalty point scores have been provided above, they serve to illustrate the advantage of the present invention in discouraging guessing. In another embodiment of the present invention, the point score for a correct (informed) answer is generally selectable between the range of 20 to 50 (+20 to +50) point and the penalty point scores for a wrong (misinformed) answer is generally selectable between the range of minus 80 to minus 150 (−80 to −150) point. Accordingly, the ratio of the absolute values of the reward point scores for a correct (informed) answer to the penalty point scores for a wrong (misinformed) answer is between approximately 13.3:100 (or 13.33%) to 62.5:100 (or 62.5%). The choice in the values of the reward point scores and the penalty point scores may depend on a variety of considerations including but not limited to the business and economic consequences associated with a right or wrong information-depending response. However, the scoring levels of +30 points for a fully informed correct answer and a minus 100 point score for a partially informed or misinformed answer have shown applicability in addressing a wide spectrum of knowledge assessment needs.

Based on this predefined weighted scoring scheme, the system calculates a weighted or raw score to include a one-dimensional right/wrong score. The weighted score can be presented as an actual percentage score the test subject has achieved for the entire test. The system also calculates a self-confidence percentage score that the test subject had thought to have achieved. This "self-confidence" score is based on the results that would have been produced if the test subject's answers were correct for all test queries selected from the "sure" and "partially sure" confidence categories. The difference between the actual score and the "self-confidence" score indicates the degree of misinformation, which could be indicative of the subject's ability to respond to situations where information is needed.

The point scores are calculated by a scoring module 108, which also calculates the test subject's other performance indices. System 8 further includes a "Prepare Test Subject feedback" module 110, which prepares the performance data and delivers them to the test subject via a "Prepare Test Subject Feedback" module 114. In a similar manner, a "Prepare Management Feedback" module 112 prepares the subject's performance data and deliver them to the test administrator via the "Management Feedback Module" 116. In one embodiment of the present invention, these score components include the raw score, knowledge profile, aggregate score; self-confidence score; misinformation gap; personal training plan; knowledge index; and performance rating.

The knowledge profile is compiled as a percentage of correct responses for each of the knowledge or information quality regions, for example, misinformed, uninformed, partially informed, and fully informed. For the example as discussed above, based on the raw score, the percentages of correct responses are mapped onto the knowledge quality regions. The quality regions include misinformed (answered 100% confident and incorrect or 50% confident and incorrect); uninformed (answered unknown); partially informed (answered 50% confident and correct); and fully informed (answered 100% confident and correct), which are shown with hypothetical percentage scores as follows:

Misinformed: 10% (answered "I Am Sure" once and incorrect)
Uninformed: 10% (answered "Unknown" three times)
Partially informed: 20% (answered "I Am Partially Sure" four times)
Fully informed: 60% (answered "I Am Sure" five times and correct).

The aggregate score can also be computed as an alternative expression of the knowledge profile expressed as a percentage by using the formula:

$$\text{Aggregate Score} = ((100*NQ) + \text{Score}))/(130*NQ); \quad (1)$$

Where NQ=Number of queries on the test; and
Score=Raw test score based on the values of:
Fully informed answer=+30
Partially informed answer=+10
Uninformed answer=0;
Misinformed answer=−100; and
"*" denotes the multiplication sign Formula (1) represents the percent of "actual" information possessed by the test subject to the maximum score possible. To the extent that the raw (weighted) score is affected by the penalty resulted from a test subject's "misinformed" answers or responses, calculation of the aggregate score is compensated or scaled by a value that is attributable to the possible penalty points for all the queries. For the example referenced above, in which a "misinformed" score is assigned a penalty of minus 100 points, the compensation or scaling has a value of 100 times the number of queries, or 100*NQ. (The "*" denotes the multiplication sign.) Thus, a test subject's "actual" information, the aggregate score, would be reflected quantitatively as (100*NQ)+the raw score. The scaling also results in a maximum score of (100*NQ+30*NQ) or 130*NQ, which is applied as the denominator of Formula 1 against which the "actual" information is weighted.

Figure 5:
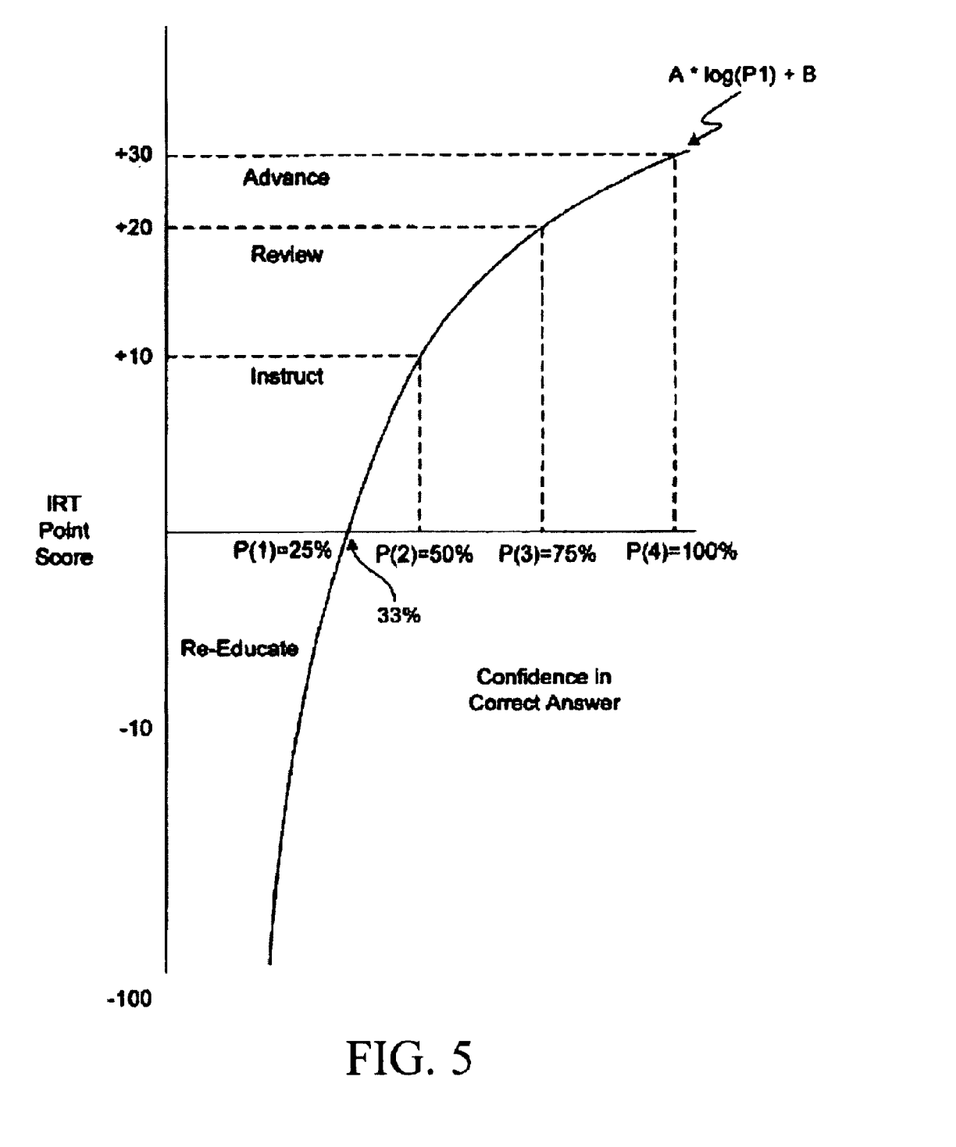
FIG. 5 is a graph which depicts the use of a log function in defining the point scores as a function of the probability that a correct answer will be scored.

The point scores of the present invention is derived by using a log function, which is expressed in the form: Score=A*log P(sub i)+B. P(sub i) reflects the probability of a correct response given the confidence levels expressed by a test subject in providing a response to a query. As shown in FIG. 5, P(sub i) has a numerical value between the range of 0%, which reflects the test subject's complete lack of confidence in achieving a correct answer, a state of being misinformed, and 100%, which indicates the subject's full confidence in achieving a correct answer, a state of being fully informed. A and B are scaling constants, which are applied to the log function to define a range of point scores projected over the probability or the test subject's confidence in achieving a correct answer between 0 and 100% as shown in FIG. 5. By adjusting the A and B scaling constants, the range of the point scores can extend over a wide range of values. For the example in the present invention, the range of point scores between +20 and −150 has shown a high degree of ease of application.

A significant aspect of the present invention is that the scoring system is validated by the degree to which it is "reproducible". That is the maximum score occurs when one does not guess, but uses their information wisely. As applied to a multiple-choice query in which three possible choices are presented and the likelihood of guessing a right answer is one out of three, the scoring protocol of the present invention neither rewards nor penalizes a choice where the test subject has a of 33% confidence in choosing the right answer. Thus, regardless of whether the test subject can choose a right or wrong answer as a response, the scoring system of the present invention would assign a score of zero where the test subject is "uninformed" of the response or answer to the query. In the example of the present invention where there are three possible choices of an answer to a query, a zero point score is assigned to a probability of 33%, which is also a statistical likelihood with which the test subject can achieve an uniformed but correct answer. Such a random choice of one of the three possible answers would also correspond to an expression of "I don't know" expressed by the test subject for a lack of information or confidence with respect to any choice.

As referenced above, A and B are scaling constants, which are applied to the log function to define the individual point scores associated with the probability of a correct response given the confidence expressed by a test subject in providing a response to a query. In the examples as referenced above, the A and B scaling constants were applied to the log function, with P(sub i=1) of 0.0; P(sub i=2) of 0.33; P(sub i=3) of 0.50; and P(sub i=4) of 1.00), to result in the respective approximate point scores of −100; 0; +10 and +30, that is, a value of −100 (for a 0 probability), 0 (for a 33% probability), +10 (for a 50% probability) and +30 (for 100% probability Depending on the values of A and B, the range of the point scores can vary. For the example in the present invention, the values of A and B were chosen to result in a scoring system having point scores between the range of 20 to 50 (+20 to +50) point for a fully informed answer and between the range of minus 80 to minus 150 (−80 to −150) point for a misinformed answer.

Thus from the above, it is apparent that the scoring protocol or system of the present invention can substantially reduce the effect of guessing. Further, compared with other scoring systems, which are often extremely complicated to remember thus not proving effective in actual classroom use, the present invention incorporates a scoring system in which the values of the points would approximate the value of 10 or its multiples. Thus the scoring system is easily communicated to the test subjects or users and is much easier to remember.

The self-confidence score is represented by the overall percentage score the test subject would have received if his or her responses were correct for all test queries where a high level of self-confidence is indicated. As discussed above, a high level of self-confidence is indicated when a query response is entered in the "I am sure" or "I am partially sure" categories, as indicative of the test subject's perception as to the confidence level in state of knowledge in himself or herself. On the other hand, a misinformation gap is quantified by system 8, which is represented by the difference between the aggregate score and the self-confidence score.

As part of the feedback, system 8 organizes the test queries, which are presented to the test subject or other system users based on the knowledge quality regions. System 8 uses the stored information created in module 102 that identifies specific curriculum for each question to create hyperlinks to that curriculum thus configuring a personal learning plan in relation to the quality regions. Thus, as soon as the test scores are calculated, the test subject or the system user will be able to identify the area of information deficiencies where remedial actions are indicated.

System 8 also provides the computation of a knowledge index, which is presented to the user on demand via the management feedback module 112. The knowledge index is based on the aggregate score as part of the knowledge profile, in which the aggregate score is correlated to seven levels of understanding to the learning materials on which the test is based. The seven levels are:

100 Excellent
92–99 Very Good—Minor review would be helpful
86–91 Good—Would benefit from thorough review
77–85 Fair—Needs further instruction
76 Minimum Knowledge—Requires significant instruction
69–75 Poor—Requires re-education on why the information is incorrect
0–68 Failed—Not qualified In addition to the above, the present invention computes a performance rating, which is presentable as part of the management feedback module 112, which might be used to predict a test subject's ability to correctly perform the information-related or information-dependent tasks. The performance rating displays the degree of confidence that a test subject possesses in correct information according to the following formula.

If the aggregate score is approximately 0.69 or above, then $$\text{Performance Rating, } XX = B4*Y^{**}4 + B3*Y^{**}3 + B2*Y^{**}2 + B1*Y^{**} \quad (2)$$

Where Y=Aggregate Score
B4=−29.408665
B3=78.467215
B2=−66.855877
B1=18.799063
If the aggregate score is less than approximately 0.69, then $$XX = 0.36*Y \quad (2a)$$

"**" denotes an exponent or power.

The performance rating as shown in Formula 2 and 2a represents the probability with which a test subject would provide a correct answer by way of an informed response, which is calculated as function of the aggregate score, as expressed in Formula (1). Formula 2 and 2a are derived by applying an anti-log of the log function as expressed in Formula 1. Where the value of the aggregate score is approximately 0.69, that is 69% or greater, the performance index is expressed as a polynomial as shown in Formula 2. Though the coefficients, B1, B2, B3 and B4 are precisely quantified to exemplify the result of the application of the anti-log, variations in their values by as much as 10% could also yield acceptable result in assessing the probability with which the test subject can provide an informed answer. Where the test subject's aggregate score is less than 0.69 or 69%, the performance rating can be linearly approximated and expressed by Formula 2a. The performance rating expression thus represents an overall assessment of the confidence that a test subject is informed of the substantive answers for a particular set of queries.

Once the performance rating has been calculated, the results expressed as a percentage can be correlated to various levels of performance categories, as exemplified by the following scale:

| | |
|---|---|
| 75%–100% | Exceptional-Of extreme value to the organization |
| 50%–74% | Accurate-Capable of handling the majority of business tasks properly |
| 34%–49% | Marginal-Requires re-training |
| 0%–33% | Unqualified-Should be reassigned to less information-sensitive tasks |

The levels of the performance rating can also be mapped unto the log function as shown in FIG. 5, on which decisions for prescribing learning information to the test subjects can be effected as part of the present invention with or without the use of the computer system resources. Thus, a test subject's performance rating of 75%–100% can be considered as having an equivalent confidence level that he or she can provide an informed answer. This level of performance rating would indicate that the test subject possesses an advanced level of the information on which the queries are administered. Thus no compelling need for presenting learning materials to the test subject is indicated. Similarly mapped, a performance level of between 50% to 74% would suggest that the test subject possess accurate information, while review of the substantive information could be considered. For a performance rating between 34% and 49%, a marginal level of the confidence level with which the test subject can provide the correct answer would warrant the retraining of the test subject. Such a marginal level of performance rating would also suggest that the test subject be disqualified from taking the test and that further instruction and/or retraining is necessary. If the performance rating is less than 33%, the test subject should not be considered assigned to the tasks that are information-sensitive and reeducation is required.

As soon as the test has been scored, any or all of the above test subject's feedback 114 is presentable to the test subject or other system users according to permissible levels of information access granted to such individuals. The following illustrates an exemplary presentation of the performance scores:

| | Score |
|---|---|
| Profile | |
| No answer | 10% |
| Misinformed | 10% |
| Partially Informed | 20% |
| Fully Informed | 60% |
| Misinformation Gap | |
| The Profile Converted to a score is: | 72% |
| The Self-Confidence Score is: | 86% |
| The Misinformation Gap is: | 14% |

Immediate presentation of the performance scores, as well as the score components, can be made in real-time. Since all results are stored on a database associated with system 8, along with the capability to export data to other database(s) as needed, on-demand retrieval and presentation of results is readily available.

Figure 4:
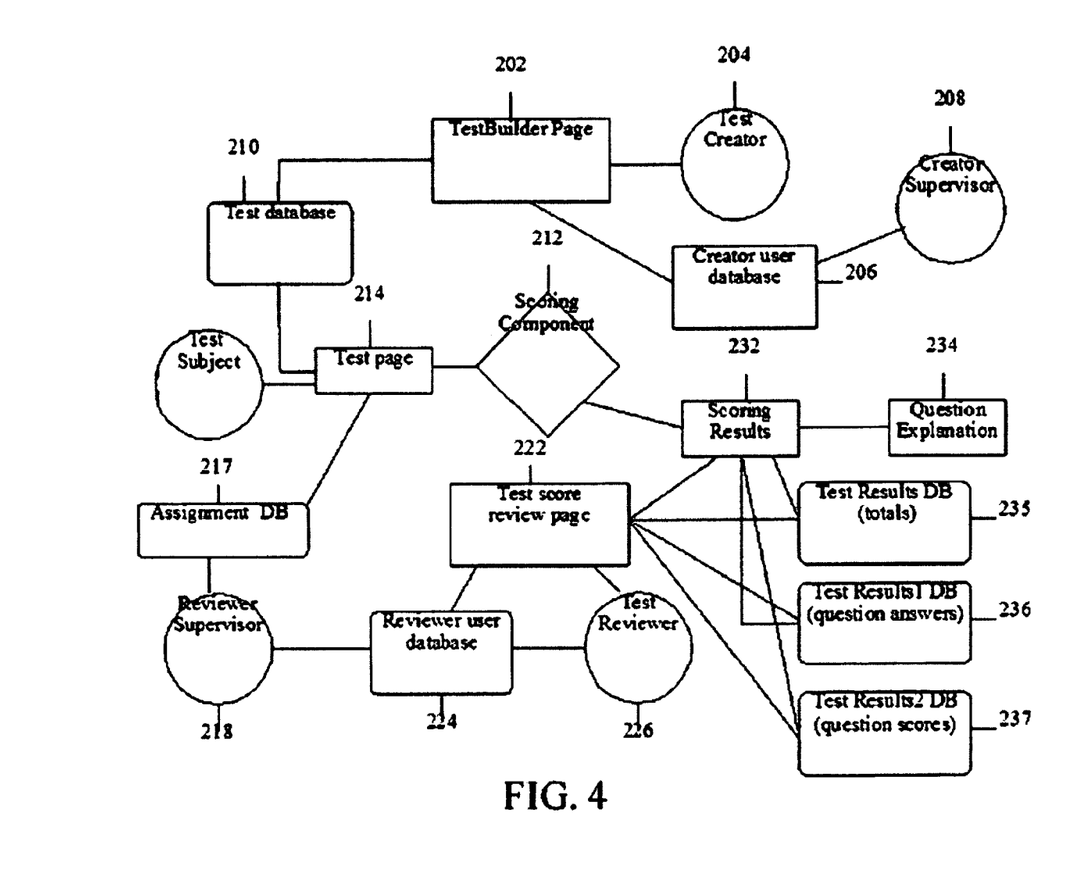
FIG. 4 is a flow diagram showing the network architecture and software solution to provide integrated test authoring, administration, tracking and reporting and associated databases according to the present invention.

The various tasks of the knowledge assessment and learning system are supported by a network architecture and software solution. FIG. 4 presents a flow diagram, which shows integrated test authoring, administration, tracking and reporting and associated databases of the present invention.

As shown in FIG. 4, in support of test creation, a TestBuilder page 202 is initiated by a test creator 204 with proper authentication identified in a creator user database DB 206. Database 206 is managed by creator supervisor 208. The test creator 204 provides content materials for the test queries, which are stored in test database, test DB 210. A test page 214 is created to incorporate test content materials from DB 210 and test assignment instructions from assignment DB 217. Assignment DB 217 includes functions such as administrative controls over the test contents, tests schedules and test subject authentication. Assignment DB 217 is managed and controlled by reviewer supervisor 218.

Test queries are administered via test page 214 to one or more authenticated test subjects 216. As soon as the test has been taken, the results are compiled and passed on to a scoring program module 212 which calculates raw score 232. The raw score, as well as other performance data, is stored as part of databases 235, 236 and 237. A test reviewer 226 generates a test score review page 222 using test result databases 235, 236, 237. Based on the analysis of the test score review page 222, the reviewer 226 may update the reviewer DB 224. The compiled and scored test results may then be reported immediately to the subjects and the subjects may be provided with their results 235, 236, 237 followed by answers with hyper-linked access to explanations for each question 234.

As described above, it is evident that the present knowledge assessment and learning system exhibits various features and advantages not present in the prior art. The present invention supports critical decisions as to whether a test subject should be reassigned, trained further, or remained assigned to functions where possession of true knowledge and the use thereof is of primary concern. Further, based on the assessment scores, as well as one or more of the score components, resources pertaining to information acquisition, personnel training, and building of knowledge capital can be effectively allocated and deployed. Such decisions and follow-on actions are supported by quantification of performance and confidence thus providing clarity as part of decision-making.

Further, the present invention provides learning support where resources for learning are allocated based on the quantifiable needs of the test subject as reflected in the knowledge assessment profile, or by other performance measures as presented herein. Thus, the present invention provides a means for the allocation of learning resources according to the extent of true knowledge possessed by the test subject. In contrast to conventional training where a test subject is generally required to repeat an entire course when he or she has failed, the present invention facilitates the allocation of learning resources such as learning materials, instructor and studying time by directing the need of learning, retraining, and reeducation to those substantive areas where the subject is misinformed or uninformed.

This aspect of the invention is effected by the system, which offers or presents a "Personal Training Plan" page to the user. The page displays the queries, sorted and grouped according to various knowledge regions. Each of the grouped queries is hyper-linked to the correct answer and other pertinent substantive information and/or learning materials on which the test subject is queried. Optionally, the questions can also be hyper-linked to online informational references or off-site facilities. Instead of wasting time reviewing all materials that encompass the test query, a test subject or user may only have to concentrate on the material pertaining to those areas that require attention or reeducation. Critical information errors can be readily identified and avoided by focusing on areas of misinformation and partial information.

To effect such a function, the assessment profile is mapped or correlated to the informational database and/or substantive learning materials, which is stored in system 8 or at off-system facilities such as resources in the World Wide Web. The links are presented to the test subject for review and/or reeducation.

In addition, the present invention further provides automated cross-referencing of the test queries to the relevant material or matter of interest on which the test queries are formulated. This ability effectively and efficiently facilitates the deployment of training and learning resources to those areas that truly require additional training or reeducation.

Further, with the present invention, any progress associated with retraining and/or reeducation can be readily measured. Following a retraining and/or reeducation, (based on the prior performance results) a test subject could be retested with portions or all of test queries, from which a second knowledge profile can be developed.

Thus as described above, the present invention provides a method and system for knowledge assessment and learning as a highly effective means for assessing the true extent of a subject's knowledge and in support of prioritized information acquisition and knowledge building. While the above description of the invention is directed to the present embodiments or examples of applications, various modifications and improvements can be made without departing from the spirit and scope of the invention.

What is claimed is:

1. A method for knowledge assessment and learning comprising the steps of:
   a. presenting to a test subject a plurality of queries derived from a computer database of learning materials, each query being answerable by a plurality of substantive multi-choice answers indicative of confidence level, said multi-choice answers including a choice of right answer that indicates complete confidence, choices of wrong answers, at least one choice of combined right and wrong answers that indicates partial confidence, and a choice of no answer that indicates no confidence;
   b. responsive to the answers to the queries by the test subject, calculating a weighted score according to a predefined scoring protocol based on a comparison of the test subject's answer with a correct substantive answer;
   c. compiling a knowledge profile based on the weighted score, the knowledge profile being qualitatively categorized by misinformed, uninformed, partially informed and fully informed quality regions, and said knowledge profile being quantitatively determined using said weighted score and a percentage of correct answers for each of the quality regions; and
   d. offering to the test subject learning materials on the substantive answer selectable from the database of learning materials according to the knowledge profile.

2. The method for knowledge assessment and learning according to claim 1, wherein the learning materials offered to the test subject are selected in reference to the test queries, the scores of which quantitatively define the misinformed and uninformed knowledge quality regions.

3. The method for knowledge assessment and learning according to claim 1, which further comprises the step of determining at least one score component selected from the group consisting of aggregate score, self-confidence score, misinformation gap, knowledge index, and performance rating.

4. The method for knowledge assessment and learning according to claim 3, wherein the aggregate score is expressed as Aggregate Score=$((100*NQ)+Score)/(130*NQ)$; where NQ is the number of queries and Score is the weighted score.

5. The method for knowledge assessment and learning according to claim 1, wherein the scoring protocol comprises point scores derived by reward and penalty points and assigned for a fully informed answer, partially informed answer and a misinformed answer, the fully informed answer being a correct answer with 100% confidence, the partially informed answer being a correct answer with a 50% confidence and the misinformed answer being an incorrect answer with 100% confidence as expressed by the test subject.

6. The method for knowledge assessment and learning according to claim 5, wherein the point score for the fully informed answer and the point score for the partially informed answer are each less than the value of the point score for the misinformed answer.

7. The method for knowledge assessment and learning according to claim 5, wherein the point score for the fully informed answer is 30 and the point score for the misinformed answer is minus 100.

8. The method for knowledge assessment and learning according to claim 5, wherein the point score for the fully informed answer is selected between 20 and 50 point and the point score for the misinformed answer is selected between minus 80 to minus 150 point.

9. The method for knowledge assessment and learning according to claim 5, wherein the ratios of the absolute values of the point score for a fully informed answer to the point scores for a misinformed answer have a range between of 13.3:100 or 13.3% and 62.5:100 or 62.5%.

10. The method for knowledge assessment and learning according to claim 1, wherein the scoring protocol is derived by applying a log function expressed as: Score=$A*\log P(\text{sub } i)+B$. where $P(\text{sub } i)$ reflects the probability of a correct response given the confidence levels expressed by a test subject in responding to a query and selected from the range of 0% and 100% and wherein A and B are scaling constants.

11. The method for knowledge assessment and learning according to claim 10, wherein the scoring protocol assigns a score of zero where the probability of the correct response approximates or equals the probability of guessing a correct response to the multi-choice answer.

12. The method for knowledge assessment and learning according to claim 10, wherein the scoring protocol assigns a score of zero to a response to the query where the test subject expresses a lack of information on the correct response.

13. The method for knowledge assessment and learning according to claim 1, wherein the presentation of the queries and the offer of learning materials is effected via a microprocessor based computing device or a networked client-server communication system.

14. The method for knowledge assessment and learning according to claim 1, which further comprises the steps of presenting learning materials to the test subject prior to the presentation of the test queries.

15. The method for knowledge assessment and learning according to claim 1, which further comprises the step of measuring the amount of time used by the test subject in answering each query.

16. The method for knowledge assessment and learning according to claim 1, which further comprises the step of measuring the amount of time used by the test subject in answering all queries presented to the test subject.

17. The method for knowledge assessment and learning according to claim 1, wherein the learning materials are stored in a networked client-server communication system.

18. A method for knowledge assessment and learning comprising the steps of:
   a. presenting to a test subject a plurality of queries derived from a computer database of learning materials, each query being answerable by a plurality of multi-choice answers indicative of confidence level, said multi-choice answers including a choice of right answer that indicates complete confidence, choices of wrong answers, at least one choice of combined right and wrong answers that indicates partial confidence, and a choice of no answer that indicates no confidence, the confidence level being in the range of complete confidence and no confidence, inclusive;
   b. responsive to the answers to the queries by the test subject, calculating a weighted score according to a predefined scoring protocol based on a comparison of the test subject's answer with a correct substantive answer, and
   c. compiling a knowledge profile based on the weighted score and calculating a performance rating derived by applying an anti-log of a log function expressed as: Score-$A*\log P(\text{sub } i)+B$, where $P(\text{sub } i)$ reflects the probability of a correct response given the confidence level expressed by a test subject in providing a response to a query and A and B are scaling constants.

19. The method for knowledge assessment and learning according to claim 18, wherein the performance rating is expressed as a formula $XX=B4*Y**4+B3*Y**3+B2*Y**2+B1*Y**1$ where Y is approximately 0.69 or greater or $XX=0.36*Y$ where Y is less than approximately 0.69, wherein Y is the aggregate score calculated by the formula $((100*NQ)+\text{Score}))/(130*NQ)$, NQ being the number of queries and Score being the weighted score and B4=29.408665, B3=78.467215, B2=66.855877 and B1=18.799063.

20. The method for knowledge assessment and learning according to claim 18, wherein the performance rating is expressed as a formula $XX=B4*Y**4+B3*Y**3+B2*Y**2+B1*Y**1$ where Y is approximately 0.69 or greater or $XX=0.36*Y$ where Y is less than approximately 0.69, wherein Y is the aggregate score calculated by the formula $((100*NQ)+\text{Score}))/(130*NQ)$, NQ being the number of queries and Score being the weighted score and B4=29.408665 + or −10%, B3=78.467215 + or −10%, B2=66.855877 + or −10% and B1=18.799063 + or −10%.

21. The method for knowledge assessment and learning according to claim 18, which further comprises the step of assigning performance categories according to the performance rating.

22. The method for knowledge assessment and learning according to claim 21, which further comprises the steps of administering learning materials to the test subject according to the performance categories.

23. A method for knowledge assessment and learning comprising:
   a first step of presenting to a test subject a plurality of queries derived from a computer database of learning materials, each query being answerable by a plurality of multi-choice answers indicative of confidence level, said multi-choice answers including a choice of right answer that indicates complete confidence, choices of wrong answers, at least one choice of combined right and wrong answers that indicates partial confidence, and a choice of no answer that indicates no confidence;
   a second step of administering a selected second set of test queries to the test subject;
   a third step of calculating a first weighted score for the test subject from answers provided in said first step, according to a predefined scoring protocol that assigns pre-defined weights based on a comparison of the test subject's subjective answer and confidence level with a correct substantive answer;
   a fourth step of compiling a first knowledge profile based on the first weighted score;
   a fifth step of calculating a second weighted score according to the pre-defined scoring protocol based on a comparison of the test subject's answers to the second set of queries with a correct substantive answers;
   and a sixth step of compiling a second knowledge profile based on the second weighted score.

24. The method for knowledge assessment and learning according to claim 23, wherein the test queries administered in said second step are selected according to the first knowledge profile compiled in said fourth step.

25. A method for knowledge assessment and learning comprising the steps of:
   a. presenting to a plurality of test subjects a plurality of queries, derived from a computer database of learning materials the queries being answerable by a plurality of multi-choice answers indicative of confidence level, said multi-choice answers including a choice of right answer that indicates complete confidence, choices of wrong answers, at least one choice of combined right and wrong answers that indicates partial confidence, and a choice of no answer that indicates no confidence;
   b. responsive to the answers, calculating a weighted score for each test subject according to a predefined scoring protocol based on a comparison of each such test subjects' answers and confidence levels with correct substantive answers;
   c. compiling a knowledge profile based on the weighted score for each test subject; and
   d. offering learning materials to the test subject on the substantive answer selectable from the database of learning materials according to the knowledge profile of each test subject.

26. The method for knowledge assessment and learning according to claim 25, wherein the test subjects are located at more than one geographical locations.

27. The method for knowledge assessment and learning according to claim 25, wherein the subjects are offered the test queries at different times.

28. The method for knowledge assessment and learning according to claim 25, wherein the knowledge profile is qualitatively categorized by misinformed, uninformed, partially informed and fully informed regions.

29. The method for knowledge assessment and learning according to claim 28, wherein each test subject is offered learning materials selected in reference to the test queries the scores of which define the misinformed and uninformed knowledge quality regions.

30. A system for knowledge assessment and learning adaptable for use in a microprocessor based computing device and in a networked client-server communication environment, the system comprising:
   a. databases comprising learning materials and test queries related to the learning materials and correct answers corresponding to the test queries stored and retrievable in the computing device;
   b. a test builder for constructing a test using the databases, the test comprising a plurality of non-one dimensional queries answerable by multi-choice answers indicative of confidence level, said multi-choice answers including a choice of right answer that indicates complete confidence, choices of wrong answers, at least one choice of combined right and wrong answers that indicates partial confidence, and a choice of no answer that indicates no confidence;
   c. administrative means located at proximate or remote locations for authenticating a test subject, presenting the test to the subject and collecting the answer to each query from the test subject;
   d. scoring means for comparing the test subject's answer to each query with a correct answer stored in the computing device, determining a weighted score according to a predefined scoring protocol and defining a knowledge profile; and
   e. means for offering to the test subject the learning materials retrievable from the database based on the knowledge profile.

31. The system for knowledge assessment and learning according to claim 30, wherein the knowledge profile is qualitatively categorized by misinformed, uninformed, partially informed and fully informed regions.

32. The system for knowledge assessment and learning according to claim 30, wherein the knowledge profile is quantitatively calculated by using the weighted score and a percentage of correct answers for each of the information quality regions.

33. The system for knowledge assessment and learning according to claim 30, wherein the learning materials offered to the test subject are selected in reference to the test queries, the scores of which quantitatively define the misinformed and uninformed knowledge quality regions.

34. The system for knowledge assessment and learning according to claim 30, wherein the scoring means further calculates at least one score component selected from the group consisting of aggregate score, self-confidence score, misinformation gaps, knowledge index and performance rating.

35. The system for knowledge assessment and learning according to claim 30, wherein the scoring protocol comprises reward and penalty point scores assigned for a fully informed answer, a partially informed answer and a misinformed answer, the fully informed answer being a correct answer with a 100% confidence, the partially informed answer being a correct answer with a 50% confidence and the misinformed answer being an incorrect answer with 100% confidence as expressed by the test subject.

36. The system for knowledge assessment and learning according to claim 35, wherein the reward point scores for a fully informed answer and for a partially informed answer are each less than the penalty point score for the misinformed answer.

37. The system for knowledge assessment and learning according to claim 35, wherein the reward point score for the fully informed answer is 30 and the penalty point score for the misinformed answer is minus 100.

38. The system for knowledge assessment and learning according to claim 35, wherein the reward point score for the fully informed answer is selected between the range of 10 and 50 point and the penalty point score for a misinformed answer is selected between the range of minus 80 and minus 120 point.

39. The system for knowledge assessment and learning according to claim 35, wherein the ratios of the absolute values of the point score for a fully informed answer to the point scores for a misinformed answer have arrange between of 13.3:100 or 13.3% and 62.5:100 or 62.5%.

40. The system for knowledge assessment and learning according to claim 30, wherein the means for offering learning materials comprises a courseware server and each of the test builder means, authentication means, administrative means and score means comprises a computer software module.

41. The system for knowledge assessment and learning according to claim 30, wherein the means for presenting the test to the test subject comprises a computer workstation including a computer, video display and an input device.

* * * * *